Figure 1:
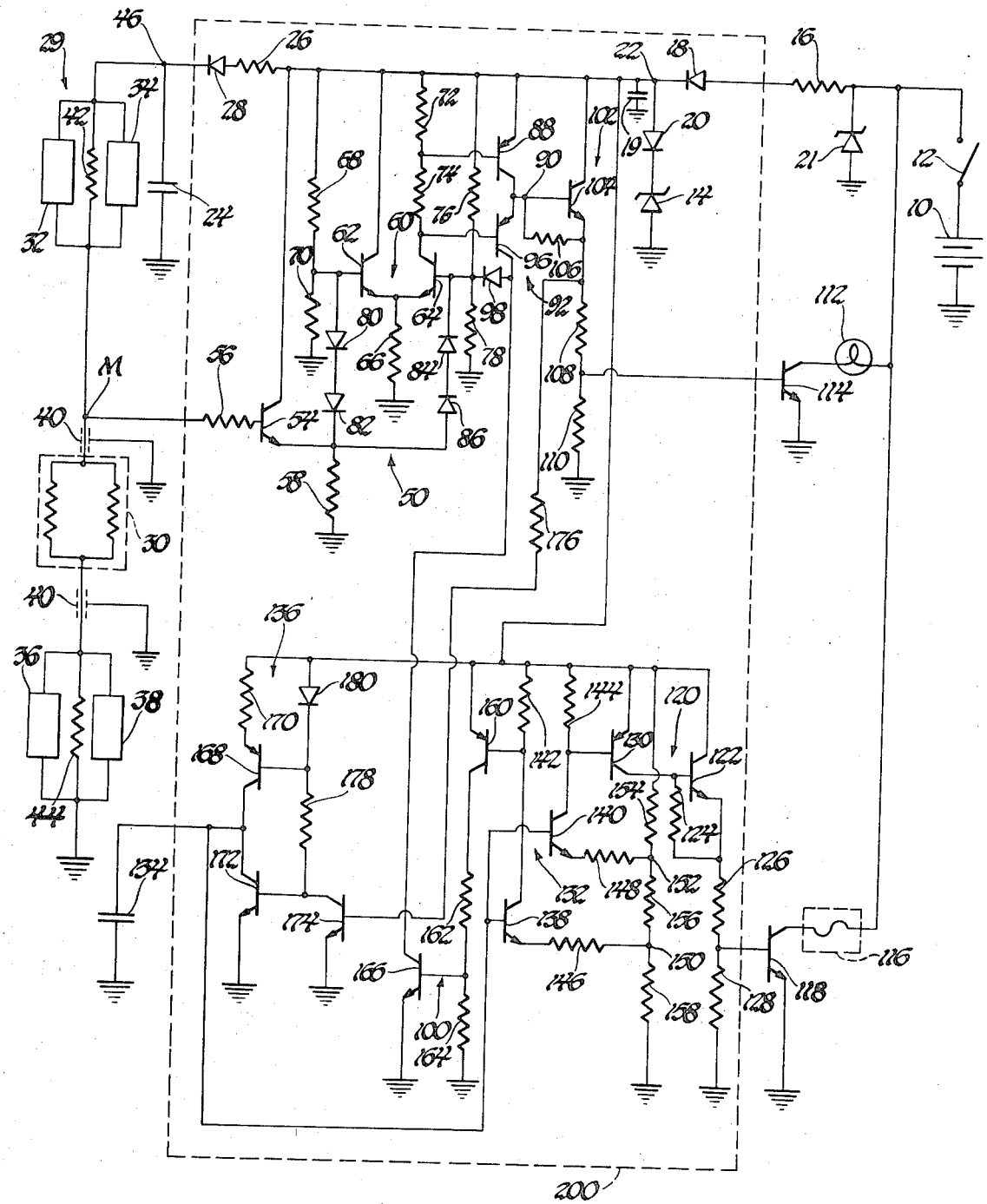

United States Patent

[11] 3,633,159

[72] Inventors: Ned E. Dillman, Galveston;
John Auzins, Kokomo, both of Ind.
[21] Appl. No.: 88,404
[22] Filed: Nov. 10, 1970
[45] Patented: Jan. 4, 1972
[73] Assignee: General Motors Corporation, Detroit, Mich.

[54] VEHICLE AIR CUSHION ACTUATION AND MONITORING CIRCUIT
4 Claims, 2 Drawing Figs.

[52] U.S. Cl. .................................................. 340/52 H, 180/91
[51] Int. Cl. ................................................ B60r 21/00
[50] Field of Search ........................................ 340/52 R, 52 H, 53; 200/61.45; 180/91, 103, 104; 280/150

[56] References Cited
UNITED STATES PATENTS
3,495,675  2/1970  Hass et al. ..................... 180/91
3,547,467  12/1970  Pociask ......................... 180/91

Primary Examiner—Alvin H. Waring
Attorneys—Eugene W. Christen, Creighton R. Meland and Albert F. Duke ABSTRACT: A vehicle air cushion actuation and monitoring circuit for preventing injury to passengers in the event of a collision. The actuation circuit includes an electrically operated actuator connected between first and second normally open acceleration-responsive switches which are in turn connected across a source of direct current firing potential. Resistors connected in parallel with the switches establish a reference potential at a junction between one of the switches and the actuator which is monitored by a detector which provides an output which energizes a lamp when the voltage at the junction rises above or drops below the reference potential by predetermined amounts. The output of the detector also activates a latch circuit which maintains the detector output. A capacitor is charged from a constant current source in response to an output from the detector and a double timing circuit responsive to the charging of the capacitor controls a latch interrupt circuit and a permanent recorder.

INVENTORS
Ned E. Dillman, &
John Auzins
BY
Albert F. Duke
ATTORNEY

VEHICLE AIR CUSHION ACTUATION AND MONITORING CIRCUIT

This invention relates to an actuation circuit for a passenger vehicle safety device and to a circuit for monitoring for malfunction in the actuator circuit.

It is an object of the present invention to provide an improved monitor for the actuation circuit of an electrically operated safety device which senses two different conditions indicative of a malfunction at a single junction in the actuation circuit.

It is another object of the present invention to provide such a monitor including timing means for precisely distinguishing between a malfunction which is of a transient nature and one that is of a permanent nature.

It is another object of the present invention to reduce the cost of the actuation circuit by reducing the size of the storage capacitor employed while maintaining the necessary energy storage for firing the actuator.

In accordance with one embodiment of the present invention the actuation circuit for effecting inflation of the air cushion is connected between a pair of acceleration-responsive switches which are in turn connected across a storage capacitor. Resistors are provided in parallel with the acceleration-responsive switches to establish a reference voltage at a junction between one of the switches and the actuator. The monitor comprises a detector which includes a differential amplifier for providing an output whenever the voltage at the junction approaches substantially the potential across the capacitor or ground potential, either potential being indicative of various malfunctions in the actuator circuit. The output of the detector is utilized to energize an indicator lamp and also activates a latch circuit to insure that an output from the detector continues even though the malfunction may have been momentary. A timing capacitor adapted to be charged from a constant current source controls a double timing circuit which deactivates the latch circuit after a first interval of time and energizes a recorder should the output of the detector remain after the latch circuit is deactivated to thereby indicate a permanent failure in the actuator circuit. In another embodiment the capacitor is charged from the output of a voltage doubler which permits the use of a lower capacitance substantially reducing the cost of the circuit.

Figure 2:
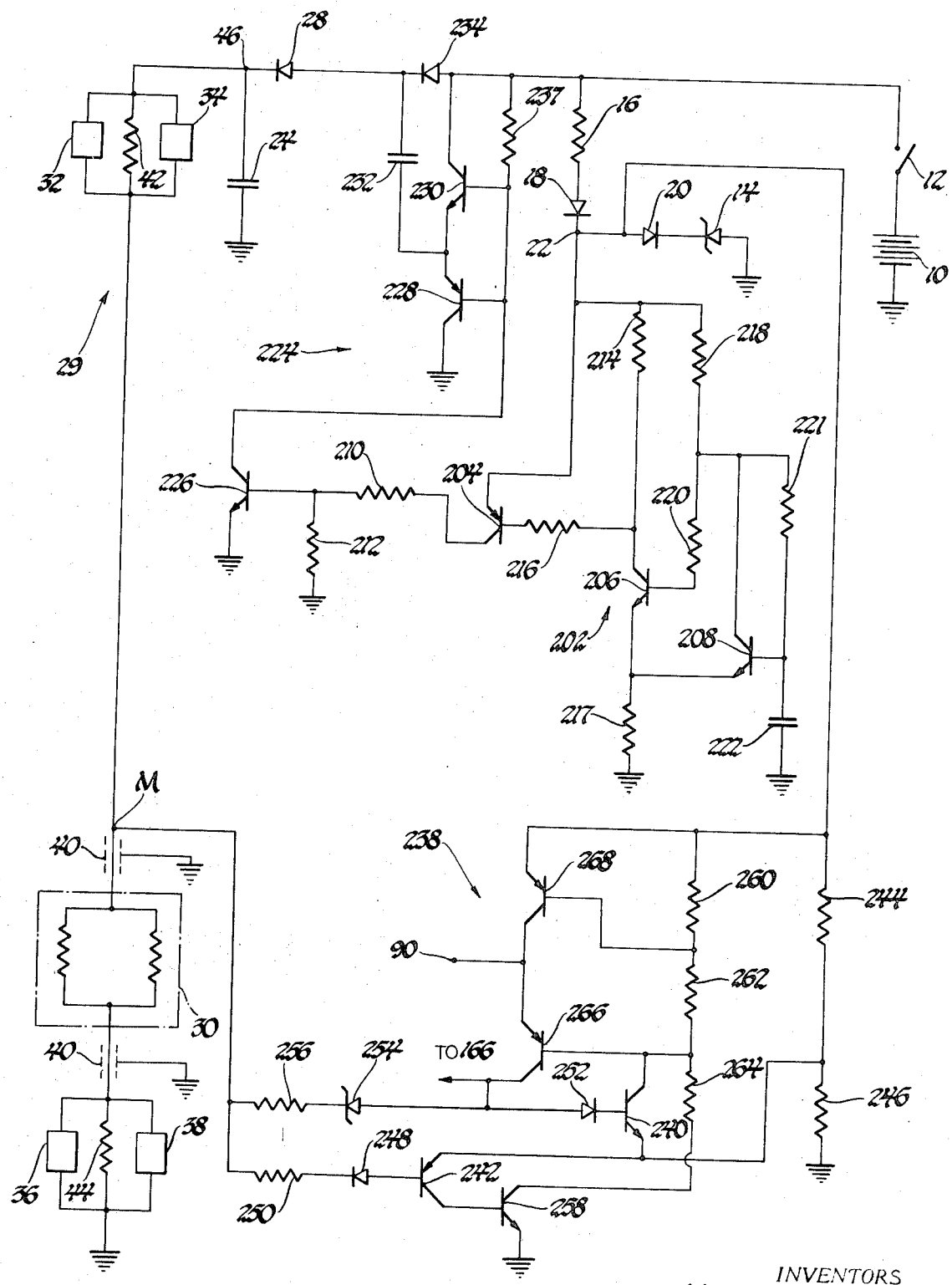

A more complete understanding of the present invention may be had from the following description which should be read in conjunction with the drawings in which FIG. 1 is a schematic diagram of one embodiment of the invention;

FIG. 2 is a schematic diagram of another embodiment of the invention.

Referring now to the drawings and initially to FIG. 1 a source of electrical power such as the vehicle battery 10 is shown to have a positive terminal connected with a manually operable on/off switch such as the vehicle ignition switch 12 and a negative terminal connected to a reference potential such as ground. A zener diode 14 is connected across the battery 10 through a resistor 16 and diodes 18, 20 to establish a regulated voltage at the junction 22. The diode 18 provides reverse voltage protection while the diode 20 provides temperature compensation. A noise filter capacitor 19 is connected between the junction 22 and ground while a zener diode 21 providing negative noise suppression is connected between ground and one side of resistor 16. A capacitor 24 is connected between ground and the regulated junction 22 through a current-limiting resistor 26 and a diode 28.

A control circuit generally designated 29 includes actuator means such as the redundant parallel-connected squibs 30 connected across the capacitor 24 through condition-responsive switches 32, 34 and 36, 38. The conductors connecting the squibs 30 to the switches 32, 34 and 36, 38 are shielded as indicated at 40 from radio-frequency interference to prevent inadvertent firing of the squibs 30. The switches 32 and 36 are normally open acceleration-responsive switches which close when the vehicle is subjected to acceleration or deceleration in excess of a predetermined magnitude and time duration such as would occur during a collision. A suitable acceleration sensor is described in copending application Ser. No. 35,674 filed May 8, 1970 entitled Sensor by Arden G. Gillund and assigned to the assignee of the present invention. Switches 34 and 38 respond to rollover of the vehicle and may be any suitable attitude-responsive switch which closes when the vehicle is inclined from the horizontal by a predetermined amount. Resistors 42 and 44 connected respectively in parallel with the switches 32, 34 and 36, 38 are substantially identical in value and establish, at a monitoring junction M, a voltage which is substantially one-half the regulated voltage at the junction 22. The resistors 42 and 44 insure that the level of normal current through the squibs 30 is less than that required to fire the squibs 30. Simultaneous closure of one of the switches 32, 34 and 36, 38 will shunt the resistors 42 and 44 and thereby increase the level of current through the squibs 30 above the level required to fire the squibs 30. In the event that the battery 10 should become disabled during the collision the storage capacitor 24 provides the requisite potential at the junction 46 to fire the squibs 30. The diode 28 prevents discharge of the capacitor 24 through the battery 10 in such event. As is well known in the art the firing of the squibs 30 may be utilized to rupture the diaphragm of the sealed pressure vessel thereby inflating an associated air cushion. Further details regarding a suitable apparatus for inflating an air cushion in response to firing of the squibs 30 may be found in copending patent application Ser. No. 36,080 filed May 11, 1970 entitled "Occupant Restraint" assigned to the assignee of the present invention.

In order to detect malfunctions in the squibs 30 or squib cabling or in the switches 32, 34 or 36, 38 the voltage at the junction M is monitored. As previously pointed out, the voltage at the junction M is normally about one-half of the regulated voltage at the junction 22, however, if either of the switches 32 or 34 become shorted or for some other reason close under conditions, other than those desired, the voltage at the junction M will be approximately the regulated potential. It will be apparent that should this occur the firing of the squibs 30 is then solely under the control of the switches 38 and 36 which obviates the safety feature provided by the series connection of the switches 32, 34 and 36, 38. Similarly should either the switches 36 or 38 become shorted or close under conditions other than those desired, the voltage at the junction M will be substantially ground potential. Likewise if the squib cables should become shorted to the shield or if the squibs or cable become open-circuited, the voltage to the junction M is substantially ground. Thus any of the aforementioned malfunctions may be detected to provide the vehicle driver with an indication of the malfunction by monitoring the voltage at the junction M.

The circuitry for monitoring the voltage at the junction M includes a detector generally designated 50 which senses the voltage at the junction M and provides an output at a junction 90 whenever the voltage at the junction M assumes a value on either side of a middle band of values. That is to say if the voltage to the junction M assumes substantially the regulated potential at junction 22 or substantially ground potential an output appears at the junction 90. The detector 50 comprises a transistor 54 having its base connected to the junction M through a resistor 56, its collector connected to the junction 22 and its emitter connected to ground through a resistor 58. A differential amplifier generally designated 60 comprises transistors 62 and 64 having their emitters connected to ground through a common resistor 66. The collector of transistor 62 is connected to the junction 22 while the base is connected to a junction between voltage-dividing resistors 68 and 70. The collector of transistor 64 is connected to the junction 22 through resistors 72 and 74 while the base is connected to a junction between voltage-dividing resistors 76 and 78. The resistor 68 is approximately one-half the value of the resistor 70 and the resistor 78 is approximately one-half of the value of resistor 76 so that the base of transistor 62 is biased to approximately two-thirds the potential of the junction 22 whereas the base of transistor 64 is biased to approximately one-third the potential of the junction 22. Thus transistor 62 is normally fully conducting and transistor 64 is normally cut off. The base of transistor 62 is also connected to the emitter of transistor 54 through diodes 80 and 82 while the base of transistor 64 is connected to the emitter of transistor 54 through the diodes 84 and 86. A transistor 88 has its base connected to the junction between resistor 72 and 74, its emitter connected to the junction 22 and its collector providing an output at the junction 90. Under normal conditions when the base of transistor 54 is at substantially one-half the potential of junction 22 the transistor 54 is conducting in the linear region between cutoff and saturation and reverse biases the diodes 80, 82, 84 and 86 to isolate the base of transistor 62 from the resistor 58.

If the voltage at the junction M rises to substantially the potential of the junction 22 as a result of short-circuiting of either switches 32, 34 for example, the transistor 54 is driven into saturation and the voltage at the emitter of the transistor 54 is substantially the potential of junction 22. The base of transistor 64 follows the emitter of transistor 54 driving transistor 64 into conduction and transistor 62 into cutoff. When the transistor 64 conducts the voltage at the base of transistor 88 drops rendering the transistor 88 conductive to provide an output at the junction 90. The diodes 80 and 82 are reversed biased by the voltage on the emitter of transistor 54 thereby ensuring that the voltage on the base of transistor 62 remains approximately two-thirds the potential of junction 22. On the other hand, should the voltage at the junction M drop to substantially ground potential as a result of, for example, a short circuit of either the switches 36 or 38, the transistor 54 is cut off and the emitter resistor 58 loads the divider network comprised of resistors 68 and 70 dropping the voltage at the base of transistor 62 and rendering the transistor 62 nonconductive. With the transistor 62 cut off the voltage at the emitter of transistor 64 drops below that on the base of transistor 64 rendering the transistor 64 conductive, lowering the voltage at the base of transistor 88 and rendering the transistor 88 conductive to provide an output at the junction 90. Thus, upon malfunction of either the switches 32, 34 or the switches 36, 38 the detector 50 provides an output at the junction 90. In addition to detection of malfunction of the switches 32, 34 and 36, 38 an open circuit in the squibs 30 or the squib cabling will be detected since this will cause the voltage at the junction M to assume substantially the potential of the junction 22. Similarly, shorting out the squib cables to the shield will be detected since this will result in substantially ground potential at the junction M.

The output of the detector 50 is supplied to a latch circuit generally designated 92 comprising a transistor 94 having its emitter connected to the collector of transistor 88, its base connected to the collector of transistor 64 and its collector connected to the base of transistor 64 through a diode 98. The purpose of the latch circuit 92 is to maintain the transistor 64 in a conductive state once it has started conducting. This will insure that a transient malfunction will produce an output at the detector 50 of sufficient duration to be processed and indicated. When transistor 64 begins conducting the transistor 96 receives base drive and once the transistor 88 begins conducting the transistor 96 is connected to the junction 22 and provides base drive to the transistor 64 through the diode 98.

The output of the detector 50 is also applied to a lamp driver circuit generally designated 102 which comprises a transistor 104 having its base connected to the collector of transistor 88, its collector to the junction 22 and its emitter connected to its base through a resistor 106 and to ground through resistor 108 and 110. A lamp 112 is connected across the battery 10 through the emitter and collector electrodes of a transistor 114 having its base connected to the junction between resistors 108 and 110. When the transistor 104 is rendered conductive it biases the transistor 114 into saturation to energize the lamp 112 and provide an indication to the vehicle operator of a malfunction in the control circuit 29.

In order to provide a record of a permanent failure in the control circuit 29 a recorder 116, which may be a fuse or other means providing a permanent record, is connected across the battery 10 through a transistor 118 having its base connected to a recorder drive circuit 120 similar to the lamp drive circuit 102. The circuit 120 comprises a transistor 122 having its collector connected to the junction 22 and its emitter connected to its base through a resistor 124 and to ground through resistors 126 and 128. The base of transistor 122 is also connected to the collector of a transistor 130 having its emitter connected at the junction 22 and its base connected to a double timing circuit generally designated 132. The double timing circuit 132 is under the control of a capacitor 134 which is driven from a constant current source generally designated 136. The purpose of the double timing circuit 132 is to actuate a latch interrupt circuit 100 which disables the latch circuit 92 after a first interval of time and to thereafter actuate the recorder drive circuit 120 it an output persists at the detector 50.

The double timing circuit 132 comprises a pair of transistors 138 and 140 having their collectors connected to the junction 22 through resistors 142 and 144 respectively and their bases connected together to the capacitor 134. The emitters of transistors 138 and 140 are connected through resistors 146 and 148 to respective junctions 150 and 152 of a voltage divider network comprising resistors 154, 156 and 158.

The latch interrupt circuit 100 comprises a transistor 160 having its emitter connected to the junction 22 and its collector connected to ground through resistors 162 and 164 and its base connected to the collector of transistor 138. The transistor 160 controls a transistor 166 having its base connected to the junction between resistors 162 and 164, its emitter grounded and its collector connected to the collector of transistor 96.

The constant current source 136 for charging the capacitor 134 comprises a transistor 168 having its emitter connected to the junction 22 through a resistor 170 and its collector connected to the capacitor 134 as well as to ground through a transistor 172. The base of transistor 172 is connected to the collector of a transistor 174 which has its emitter grounded and its base connected to the emitter of transistor 104 through a resistor 176. The base of transistor 168 is connected to a junction between a resistor 178 and a diode 180. The diode 180 is connected to the junction 22 while the resistor 178 is connected to ground through the emitter and collector electrodes of transistor 174. The transistor 172 is normally forward biased through the diode 180 and resistor 178 to shunt the output of the constant current source 136 away from the capacitor 134.

The overall operation of the circuit will now be described. Under normal conditions the voltage at the junction M is substantially one-half of the voltage across the capacitor 24 and consequently, there is no output from the detector 50. Thus, the transistors 104 and 114 are nonconductive which prevents energization of the lamp 112. The transistor 172 is forward biased through the diode 180 and the resistor 170 thereby shunting the output from the constant current source 136 away from the capacitor 134 and maintaining the capacitor 134 in a discharged state. Since the transistor 172 is in a saturated state the bases of transistors 138, and 140 are at ground potential and are therefore cut off. With the transistor 138 cut off the transistors 160 and 166 are also nonconductive. With the transistor 140 cut off the transistors 130, 122 and 118 are nonconductive and no current flows through the recorder 116.

If a malfunction occurs in the control circuit 29 whether it be of a transient and self-correcting nature or a permanent nature the voltage at the junction M will change to either substantially the regulated potential at junction 22 or ground potential. In either event the transistor 88 will conduct and connect the junction 90 to the junction 22 which will render the transistor 104 and thus the transistor 114 conductive to energize the lamp 112. The transistor 96 in latch circuit 92 is also rendered conductive to insure an output at the junction 90 irrespective of the voltage at the junction M. When the transistor 104 conducts the transistor 174 is driven to saturation which removes the base drive from the transistor 172 driving it to cutoff and thereby permitting the capacitor 134 to charge from the constant current source 136. As the capacitor 134 charges to a voltage above that appearing at the junction 150 the transistor 138 is rendered conductive which turns on the transistors 160 and 166 thus connecting the collector of the transistor 96 to ground and interrupting the latch provided by the circuit 92. The diode 98 isolates the transistor 166 from the transistor 64. Thus, at this point the detector 50 is unlatched and will produce an output only if the voltage at the junction M is still either substantially battery potential or ground potential. If the malfunction was temporary in nature and the voltage at the junction M has returned to its normal value the transistor 88 and thus transistors 104 and 174 will cut off, driving the transistor 172 to saturation and shunting the capacitor 134. If on the other hand the malfunction was permanent the transistor 88 will continue conducting and the capacitor 134 will continue to charge. When the capacitor 134 charges to a value above that established at the junction 152 the transistor 140 is rendered conductive which in turn drives the transistors 130, 122 and 118 to saturation thereby energizing the recorder 116 to provide a permanent record of the malfunction.

The circuit shown in FIG. 1 was constructed with the components shown within the dotted line designated 200 using bipolar monolithic integrated-circuit devices. By way of example the value of certain components shown in FIG. 1 were as follows:

| Resistor 16 | 100 ohms |
| --- | --- |
| Resistors 26, 74, 108, 126, 158 | 1 kΩ |
| Resistors 154, 156 | 1.5 kΩ |
| Resistor 148, 146 | 3 kΩ |
| Resistors 56, 66, 68, 78, 162, 176 | 5 kΩ |
| Resistors 42, 44, 170 | 7.5 kΩ |
| Resistors 70, 76, 110, 128, 164 | 10 kΩ |
| Resistors 72, 124, 142, 144, 106 | 20 kΩ |
| Capacitor 24 | 300 microfarads |
| Capacitor 134 | 22 microfarads |

Referring now to FIG. 2 an embodiment of the invention which permits substantial reduction in the size of the capacitor 24 is shown. Identical components in FIGS. 1 and 2 have been provided with identical legends. A Schmitt trigger oscillator generally designated 202 is connected to the regulated potential at the junction 22 between the diodes 18 and 20 and comprising transistors 204, 206, and 208. The transistor 204 has its emitter connected to the junction 22; its collector connected to ground through resistors 210 and 212 and its base connected to junction 22 through resistors 214 and 216. The transistor 206 has its collector connected to the junction between the resistors 214 and 216; its emitter connected to ground through a resistor 217 and its base is connected to the junction 22 through resistors 218 and 220. The transistor 208 has its collector connected to the junction between resistors 218 and 220; its base connected to a junction between a resistor 221 and a capacitor 222 and its emitter connected to ground through the resistor 217. The capacitor 222 charges and discharges within the hysteresis limits of the Schmitt trigger 202 producing an AC output signal at the junction between the resistors 210 and 212. A voltage doubler generally designated 224 comprises transistors 226, 228 and 230 and capacitor 232 as well as diodes 234 and 28. The emitter and collector electrodes of transistor 226 are connected across the battery 10 through a resistor 237 while the base of transistor 226 is connected to the junction between the resistors 210 and 212 and thus responds to the pulsating output of the transistor 204.

Assuming that the capacitor 222 is initially discharged the transistor 208 is biased off, the transistor 206 is biased on, and the transistor 204 is biased on. As the capacitor 222 charges through resistors 218 and 221 a point is reached where the transistor 208 is rendered conductive which removes the base drive to the transistor 206, turning the transistor 206 off, which in turn biases the transistor 204 off. The resistor 218 is substantially larger than the resistor 214 so that when the transistor 208 turns on the current through the resistor 217 is much lower than previously existed when the transistor 206 was conducting. Consequently, the voltage at the emitter of transistor 208 is substantially less than the voltage on the base of transistor 208 so that the transistor 208 is driven to saturation and the capacitor 222 discharges through the base emitter electrodes of the transistor 208. The capacitor 222 will continue to discharge until the voltage across the capacitor 222 drops below the lower input hysteresis voltage level established by the voltage at the emitter of transistor 208 at which time the transistor 208 will be cut off and the transistor 206 turned on. The voltage across the resistor 217 will suddenly switch to a much higher value due to the lower value of resistance of resistor 214. With the emitter-base electrodes of transistor 208 reverse biased the capacitor 222 will once again charge through the resistors 218 and 221 to the upper hysteresis level of the Schmitt trigger 202. Each time the transistor 206 is switched on and off the transistor 204 is switched on and off to provide the AC output signal at the junction between the resistors 210 and 212.

The operation of the voltage doubler 224 is as follows: Assuming transistor 226 is saturated the base of transistor 228 is essentially grounded which turns on the transistor 228 and at the same time turns off the transistor 230. Capacitor 232 will charge to approximately the potential of the battery 10 through the transistor 228 and the diode 234. When the transistor 226 switches off the transistor 228 is turned off and the resistor 237 drives the transistor 230 to saturation. This places the lower end of capacitor 232 in approximately the potential of battery 10 so that the other end of capacitor 232 is at approximately twice the potential of the battery 10. The diode 234 prevents discharge of the capacitor 232 into the other portions of the circuit. The charge on the capacitor 232 bleeds off through the diode 28 to the storage capacitor 24. Thus the capacitor 24 is normally charged to a voltage substantially twice that of the battery 10.

The detector in FIG. 2 generally designated 238 is functionally the same as that shown in FIG. 1. However, it is structurally somewhat different due to the increased voltage at the junction M resulting from the use of the voltage doubler 224. The detector 238 comprises a pair of transistors 240 and 242 having their emitters connected to a junction between voltage-dividing resistors 244 and 246. The resistors 224 and 226 are connected between ground and the junction 22 which provides a regulated voltage. The base of transistor 242 is connected to the junction M through a diode 248 and a resistor 250. The voltage at the junction M under normal conditions is substantially higher than the voltage at the emitter of transistor 242 so that consequently the transistor 242 is normally nonconductive. The base of transistor 240 is connected to the junction M through a diode 252, a zener diode 254 and a resistor 256. The zener diode 254 normally prevents base drive to the transistor 240 until the voltage at the junction M rises to a value sufficient to break down the zener diode 254. The collector of transistor 242 is connected to the base of a transistor 258 which has its emitter grounded and its collector connected to the junction 22 through resistors 260, 262, and 264. The collector transistor 240 is connected to the base of a transistor 266 which has its collector connected to the anode of diode 252 and its emitter connected to the collector of a transistor 268. The emitter of transistor 268 is connected to the junction 22 while the base of transistor 268 is connected to a junction between the resistors 260 and 262.

Should a malfunction occur in the actuator circuit causing the junction M to assume substantially ground potential the transistor 242 will be forward biased and will provide base drive to the transistor 258 to render it conductive which in turn provides base drive to the transistors 266 and 268. The junction 90 is thus connected to the junction 22 and energizes the lamp 112 in the same manner as described with regard to FIG. 1. When the transistor 268 turns on it provides a source for the transistor 266, the output of which drives the base of transistor 240 through the diode 252 to drive the transistor 240 to a conductive state irrespective of the potential of the junction M. The collector of transistor 266 is connected to the collector of transistor 166 in FIG. 1 which provides the latch interrupt previously described in connection with FIG. 1.

Should a malfunction occur in the actuator circuit which causes the voltage to junction M to assume substantially the potential of the capacitor 24 the zener diode 254 will conduct which will render the transistor 240 conductive. When the transistor 240 turns on the transistors 266 and 268 are rendered conductive to provide an output at the junction 90 and to latch the transistor 240 in a saturated condition irrespective of the voltage at the junction M in the same manner as previously described.

As previously indicated the advantage of the circuit of FIG. 2 over that shown in FIG. 1 is that the capacitor 24 may be substantially smaller thereby significantly lowering the overall cost of the circuit. This is because the energy storage capability of the capacitor 24 is equal to $\frac{1}{2}cv^2$. Thus by doubling the capacitor voltage a capacitor of only one-fourth as large can be used to store the same energy.

By way of example, the value of certain components shown in FIG. 2 were as follows:

| | |
|---|---|
| Resistors 210, 214, 250, 262 | 1 kΩ |
| Resistor 246 | 1.2 kΩ |
| Resistors 212, 221 | 10 kΩ |
| Resistor 244 | 2.6 kΩ |
| Resistors 216, 218, 220, 238, 256, 264 | 5 kΩ |
| Resistor 260 | 20 kΩ |
| Capacitor 222 | 0.01 microfarad |
| Capacitor 238 | 0.22 microfarad |
| Capacitor 24 | 50 microfarads |

Having thus described my invention what we claim is:

1. In a passenger conveyance provided with a safety device adapted to be actuated by electrically operated actuator means; the combination of a control circuit for operating said actuator means and adapted to be connected to a source of direct current potential, said control circuit comprising first and second normally open condition-responsive switch means connected to opposite sides of said actuator means, detector means connected to a junction between said first condition-responsive switch means and said actuator means, means normally establishing a reference potential at said junction when both the said first and second condition-responsive switch means are open, said detector means providing an output when the voltage at said junction attains a predetermined potential above or below said reference potential, indicator means adapted to be energized in response to the output of said detector means, latch means responsive to an output from said detector means for maintaining the output from said detector means irrespective of the potential at said junction, recorder means, time delay means responsive to the output of said detector means for deactivating said latch means after a first interval of time, and for energizing said recorder means if the output of said detector means continues for a second interval of time subsequent to deactivation of said latch means.

2. The invention defined in claim 1 wherein said time delay means comprises a capacitor, a constant current source for charging said capacitor, semiconductor switch means connected in parallel with said capacitor and normally conducting to prevent charging of said capacitor from said constant current source, means responsive to an output from said detector means for rendering said first semiconductor switch means nonconductive to permit charging of said capacitor, a double timing circuit comprising second and third semiconductor switch means, a voltage divider network having respective junctions connected to said second and third semiconductor switch means for establishing first and second turn on potentials respectively, means connecting said second and third semiconductor switch means to said capacitor whereby said second and third semiconductor switch means are rendered conductive in succession as said capacitor charges above said first and second turnoff potentials respectively.

3. The invention defined in claim 1 wherein said detector means comprises a differential amplifier including first and second transistors having their emitter and collector electrodes connected across said source through a common emitter resistor, first and second voltage divider means respectively connected to the base electrodes of said first and second transistors and normally biasing said first transistor to saturation and said second transistor to cutoff, control means for switching said first transistor to cutoff and said second transistor to saturation in response to said predetermined potential, comprising a third transistor having a base connected to said junction, means including an emitter resistor connecting the emitter and collector electrodes of said third transistor across said source and normally biasing said third transistor between cutoff and saturation, first diode means having a cathode connected to the emitter of said third transistor and an anode connected to the base of said first transistor, and second diode means having an anode connected to the emitter of said third transistor and a cathode connected to the base of said second transistor.

4. In a passenger conveyance provided with an air cushion for preventing injury to passengers in the event of a collision and further provided with electrically operated actuator means for inflating said air cushion in response to current flow of a predetermined magnitude and duration, a control circuit for operating said actuator including oscillator means connected across a source of direct current potential for developing a pulsating output, voltage doubler means responsive to said pulsating output for developing an output voltage substantially twice the potential of said source, a capacitor connected across said voltage doubler means for storing a charge equal to the output voltage of said voltage doubler means, and first and second normally open acceleration-responsive switch means connected to opposite sides of said actuator means and connecting said actuator means across said capacitor to provide a discharge path for said capacitor upon simultaneous closure of said first and second switch means.

* * * * *